US008597025B2

(12) United States Patent
Belenkii et al.

(10) Patent No.: US 8,597,025 B2
(45) Date of Patent: Dec. 3, 2013

(54) CELESTIAL WEAPONS ORIENTATION MEASURING SYSTEM

(75) Inventors: Mikhail Belenkii, San Diego, CA (US);
Donald Bruns, San Diego, CA (US);
Timothy Brinkley, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 12/586,813

(22) Filed: Sep. 28, 2009

(65) Prior Publication Data

US 2012/0021385 A1 Jan. 26, 2012

Related U.S. Application Data

(63) Continuation-in-part of application No. 11/604,133, filed on Nov. 24, 2006, now abandoned, and a continuation-in-part of application No. 12/283,785, filed on Sep. 15, 2008, now abandoned, and a continuation-in-part of application No. 12/319,651, filed on Jan. 8, 2009, and a continuation-in-part of application No. 12/583,776, filed on Aug. 25, 2009, now Pat. No. 8,471,906.

(60) Provisional application No. 61/194,308, filed on Sep. 26, 2008.

(51) Int. Cl.
*F41G 3/26* (2006.01)

(52) U.S. Cl.
USPC .................................. 434/19; 434/16; 434/21

(58) Field of Classification Search
USPC ............. 434/16, 19, 26, 27, 111, 284, 21, 23, 434/106
See application file for complete search history.

(56) References Cited

U.S. PATENT DOCUMENTS

| 3,169,191 | A  | * | 2/1965  | Knapp .................... 250/214.1 |
| 3,981,010 | A  | * | 9/1976  | Michelsen .................. 342/55 |
| 6,449,892 | B1 | * | 9/2002  | Jenkins ..................... 42/1.01 |
| 7,245,325 | B2 | * | 7/2007  | Yamaguchi ................ 348/364 |
| 7,787,012 | B2 | * | 8/2010  | Scales et al. ............... 348/158 |
| 2004/0003073 | A1 | * | 1/2004  | Krzyzanowski et al. ..... 709/223 |
| 2004/0198336 | A1 | * | 10/2004 | Jancic et al. ................ 455/420 |
| 2005/0217127 | A1 | * | 10/2005 | Hermann .................... 33/365 |
| 2006/0005447 | A1 | * | 1/2006  | Lenner et al. ................ 42/111 |
| 2006/0028550 | A1 | * | 2/2006  | Palmer et al. .............. 348/155 |
| 2006/0073439 | A1 | * | 4/2006  | Tengblad .................... 434/12 |
| 2007/0243504 | A1 | * | 10/2007 | Bjorkman et al. ........... 434/22 |
| 2008/0034954 | A1 | * | 2/2008  | Grober ..................... 89/41.05 |
| 2008/0163504 | A1 | * | 7/2008  | Smith et al. ................. 33/268 |
| 2010/0221685 | A1 | * | 9/2010  | Carter ........................ 434/19 |

* cited by examiner

*Primary Examiner* — Bruk Gebremichael
(74) *Attorney, Agent, or Firm* — John R Ross (57) ABSTRACT

A celestial weapons orientation measuring system. The system includes a miniature celestial direction detection device. The device includes an inclinometer, a camera for imaging at least one celestial object and a processor programmed with a celestial catalog providing known positions at specific times of at least one celestial object and algorithms for automatically calculating target direction information based on the inclination of the system as measured by the inclinometer and the known positions of the celestial object as provided by the celestial catalog and as imaged by the camera. Similar to the training technique discussed in the background section, the pretend enemy wears a GPS detector and transmitter, and a computer system is preferably provided which determines when a trigger-pull results in a "casualty". Preferred embodiments also include an inertial navigation sensor including a magnetic compass and a memory-based optical navigation system that permits continued operation on cloudy days and even in certain in-door environments.

12 Claims, 4 Drawing Sheets

CELESTIAL WEAPONS ORIENTATION MEASURING SYSTEM

CROSS REFERENCE TO RELATED APPLICATIONS

This application is a continuation in part of patent application Ser. No. 11/604,133, Celestial Compass, filed Nov. 24, 2006, Ser. No. 12/283,785, Portable Celestial Compass filed Sep. 15, 2008, Ser. No. 12/319,651, Angles Only Navigation System filed Jan. 8, 2008 and Ser. No. 12/583,776 Miniature Celestial Direction Detector filed Aug. 25, 2009, each of which are incorporated herein by reference. This application also claims the benefit of Provisional Patent Application Ser. No. 61/194,308 filed Sep. 26, 2008.

FEDERAL SUPPORTED RESEARCH

The present invention was made in the course of work under contract number N00178-08-C-0019 with the United States Navy and the United States Government had rights in the invention.

FIELD OF INVENTION

The present invention relates to direction detection systems, especially to such systems designed for use in determination of precise locations of targets.

BACKGROUND OF THE INVENTION

Sky Charts

The position of celestial objects at any time at any place on earth is known with extremely high accuracy. These celestial objects include all recognizable stars and planets, the sun and the moon. Celestial objects also include visible man-made satellites. Accurate positioning of the celestial objects depends only on knowledge of the latitude and longitude position and on the date and the time to within about 1 to 3 seconds of observation. Latitude and longitude generally can be determined easily with precision of less than one meter with available maps or with global positioning equipment. Computer programs with astronomical algorithms are available that can be used to calculate the positions of any of these celestial objects at any time for any position on or near the surface of the earth. Star pattern recognition computer programs are available in the prior art. These computer programs are described in several good text books including *Astronomical Algorithms* by Jean Meeus, published by Willmann-Bell with offices in Richmond Va. Techniques for using the programs to determine the positions of the celestial objects are clearly described in this reference. Programs such as these are used to provide planetarium programs such as "The Sky" available from Software Bisque and "Guide" available from Project Pluto.

Fisheye Lenses

Fisheye lenses are lenses with a highly curved protruding front that enables it to cover a solid angle of about 180 degrees. The lenses provide a circular image with barrel distortion.

MEMS Inclinometers

Vertical at the observation position can easily be found by using an inclinometer. Tiny micro-electro-mechanical systems (MEMS) type inclinometers (such as Analog Devices ADIS 162097) with accuracies better than 2 milliradians are available from suppliers such as Jewell Instruments with offices in Manchester, N.H. The cost of these inclinometers typically is in the range of about $2,000.

Magnetic Compasses

Magnetic compasses are typically accurate to only one degree, and the presence of steel or other local disturbances will often reduce accuracy of the magnetic compasses to several degrees or render them useless. Therefore, if positioning of a target depends on the use of a magnetic compass, substantial position errors could likely result. In the case of military operations, the accuracy of current and future fire support systems strongly depends on the errors in target coordinates called target location error (TLE). In order to reduce collateral damage and improve target lethality, a TLE on the order, or less than, 10 meters at 5 km range is needed. Current target location technology does not meet this standard. The main source of error is magnetic compasses. Commonly a ground-based observer determines target coordinates using a laser rangefinder, GPS receiver, and magnetic compass. Measurement error of a magnetic compass typically is 10-17 milliradians. This corresponds to the TLE of 50-85 meters at a 5 km range. In many situations knowledge of the true azimuth to a target with precision of much better than 1 degree is needed. Also magnetic compasses are highly sensitive to random errors caused by weakly magnetic disturbances (e.g. vehicles, buildings, power lines etc.) and local variations in the earth's geo-magnetic field. These error sources are random and cannot be accurately calibrated and modeled to subtract out. A large magnetic disturbance from hard or soft iron effects can result in target accuracy errors of up to 30 to 60 degrees.

Attitude Heading and Reference Systems

Attitude heading reference systems (AHRS's) are 3-axis sensors that provide heading, attitude and yaw information for aircraft. AHRS's are designed to replace traditional mechanical gyroscopic flight instruments and provide superior reliability and accuracy. These systems consist of either solid-state or MEMS gyroscopes, accelerometers and magnetometers on all three axes. Some of these systems use GPS receivers to improve long-term stability of the gyroscopes. A Kalman filter is typically used to compute solutions from these multiple sources. AHRS's differ from traditional inertial navigation systems (INS's) by attempting to estimate only attitude (e.g. pitch, roll) states, rather than attitude, position and velocity as is the case with an INS.

AHRS's have proven themselves to be highly reliable and are in common use in commercial and business aircraft. Recent advances in MEMS manufacturing have brought the price of Federal Aviation Administration certified AHRS's down to below $15,000.

Safe Rifle Training Tools

Military organizations have developed non-lethal tools and techniques for training soldiers in the use of rifles in battle. These include rifles that shoot air-soft B-B's and small paint balls at relatively low velocities. The pretend soldiers know when they have been hit with these projectiles. The paint balls break on contact leaving a spattered pattern on the clothing of the soldier. In another prior art approach rifles are equipped with an eye-safe laser which is "fired" at the pretend enemy soldier. The pretend enemy soldier wears a vest that contains sensors that record a hit when illuminated with the laser beam. In a third training technique the rifle is equipped with directional components that constantly determine the direction that the rifle is pointing and the time the trigger is pressed. With this approach the pretend enemy soldier wears a Global Positioning System (GPS) device that constantly determines his location with an accuracy of about one foot. All of the information is transmitted to a computer system which is programmed to determine on each trigger pull if an enemy soldier is "hit". The present invention is an improvement of this third training technique which is described in more detail below.

Prior Art Weapons Orientation Module

The United States Army has experimented with a weapons training technique that makes use of a weapons orientation module which is mounted on a rifle and continuously records and transmits the pointing direction of the rifle. As indicated above pretend enemy soldiers (or other pretend bad guys) wear GPS devices that continuously determine and transmit their location. A computer processes the transmitted information and records enemy casualties. The weapons orientation module includes a magnetic compass and a miniature inclinometer to determine rifle direction, a GPS unit to determine rifle position and a set of three gyroscopes to determine changes in direction. After the system is oriented at startup, the three gyroscopes will continue for short periods to provide accurate directional information even in the absence of good compass information from the magnetic compass. Several problems are associated with this technique most of which are related to the use of the magnetic compass as the directional reference. A fundamental limitation of this approach is that the heading is determined from the magnetic field data. But the magnetometers are highly sensitive to many random error sources such as sun spot activity and hard and soft iron effects. These error sources are random and cannot be accurately characterized or modeled to subtract out. These weapon orientation modules are available from suppliers such as Innalabs with offices in Dulles, Va.

Although gyroscopes are used to measure changes in orientation, without the absolute references from accelerometers and magnetometers the system accuracy quickly degrades. As such, when there are extended periods of interferences or errors introduced into the sensing of gravity or magnetic field performance of the system can be seriously compromised. As a general reference, gravity is almost perfect—it is a constant force that is not influenced dramatically by anything. The most difficult error introduced in sensing gravity is the acceleration added during movements. Each time the weapon is moved, acceleration is sensed, thus creating a potential for error. This however is easily mitigated by applying algorithms to the data that filter out such high frequency accelerations, resulting in a very accurate means of determining the vector of gravity. Note that this information is used only for initial setup and system corrections, and is not needed for real-time tracking of orientation. Magnetic field disturbances are much more difficult to deal with.

The Need

What is needed is a better device for determining the pointing direction of a rifle-type weapon.

SUMMARY OF THE INVENTION

The present invention provides a celestial weapons orientation measuring system. The system includes a miniature celestial direction detection device. The device includes an inclinometer, a camera for imaging at least one celestial object and a processor programmed with a celestial catalog providing known positions at specific times of at least one celestial object and algorithms for automatically calculating target direction information based on the inclination of the system as measured by the inclinometer and the known positions of the celestial object as provided by the celestial catalog and as imaged by the camera. Similar to the training technique discussed in the background section, the pretend enemy wears a GPS detector and transmitter and a computer system is preferably provided which determines when a trigger-pull results in a "casualty". Preferred embodiments also include an inertial navigation sensor including a magnetic compass and a memory-based optical navigation system that permits continued operation on cloudy days and even in certain indoor environments.

Preferred embodiments of the present invention operate both day and night. These embodiments use celestial sighting of the sun, moon or stars to provide absolute azimuth measurements relative to absolute north under clear skies or partly cloudy conditions. An internal MEMS inclinometer provides elevation measurements relative to the local vertical (gravity based). Celestial observations are combined with known observer position and time, obtained from a GPS receiver, in order to compute the absolute azimuth pointing of the device.

The present invention has the following principal advantages over the similar prior art device discussed in the background section:

Nonmagnetic compass
  No performance degradation over time (no drift)
  Compact
  No moving parts
  Lightweight
  Low power
  Low cost
  RMS azimuth measurement error is 1 mil
  Low production cost
  Allow for operation in urban environments, near vehicles and power lines, and while wearing body armor
  Near zero startup time (azimuth measurement in 1 sec)

Another principal advantage of embodiments of the present invention is that it has been miniaturized. The embodiments continuously measure absolute heading relative to the Earth's true north with accuracy of 1 mil without the use of pre-emplaced infrastructure and does not rely on the use of magnetometer. Embodiments that rely solely on clear skies have limitations:

a) They cannot operate in the presence of heavy clouds, fog, and smoke,
  b) Highly dynamic conditions can degrade performance and
  c) These embodiments cannot operate in indoor conditions.

To overcome these limitations preferred embodiments include additional components; namely, an inertial navigation sensor and a memory-based optical navigation system.

The inertial navigation sensor integrates three inertial sensor technologies: gyroscopes, accelerometers, and magnetometers. Accelerometers and magnetometers are used to measure the Earth references of gravity and magnetic field. By utilizing three orthogonally mounted accelerometers, the sensor is able to accurately measure the pitch and roll of the rifle with accuracy better than 1.7 mils. The heading is determined from the magnetic field data. Three orthogonally mounted gyroscopes provide information on the dynamic motion of the hand-held weaponry. The system includes an adaptive Kalman filter algorithm reduces the bias errors of the gyros.

The memory-based optical navigation system includes a processor programmed with images of the environment where the training is to take place. Images of the environment recorded by a camera mounted on the rifle are analyzed with special algorithms by a computer processor which determines, from the camera images and the programmed images, the pointing direction of the rifle.

DETAILED DESCRIPTION OF PREFERRED EMBODIMENTS

Figure 1:
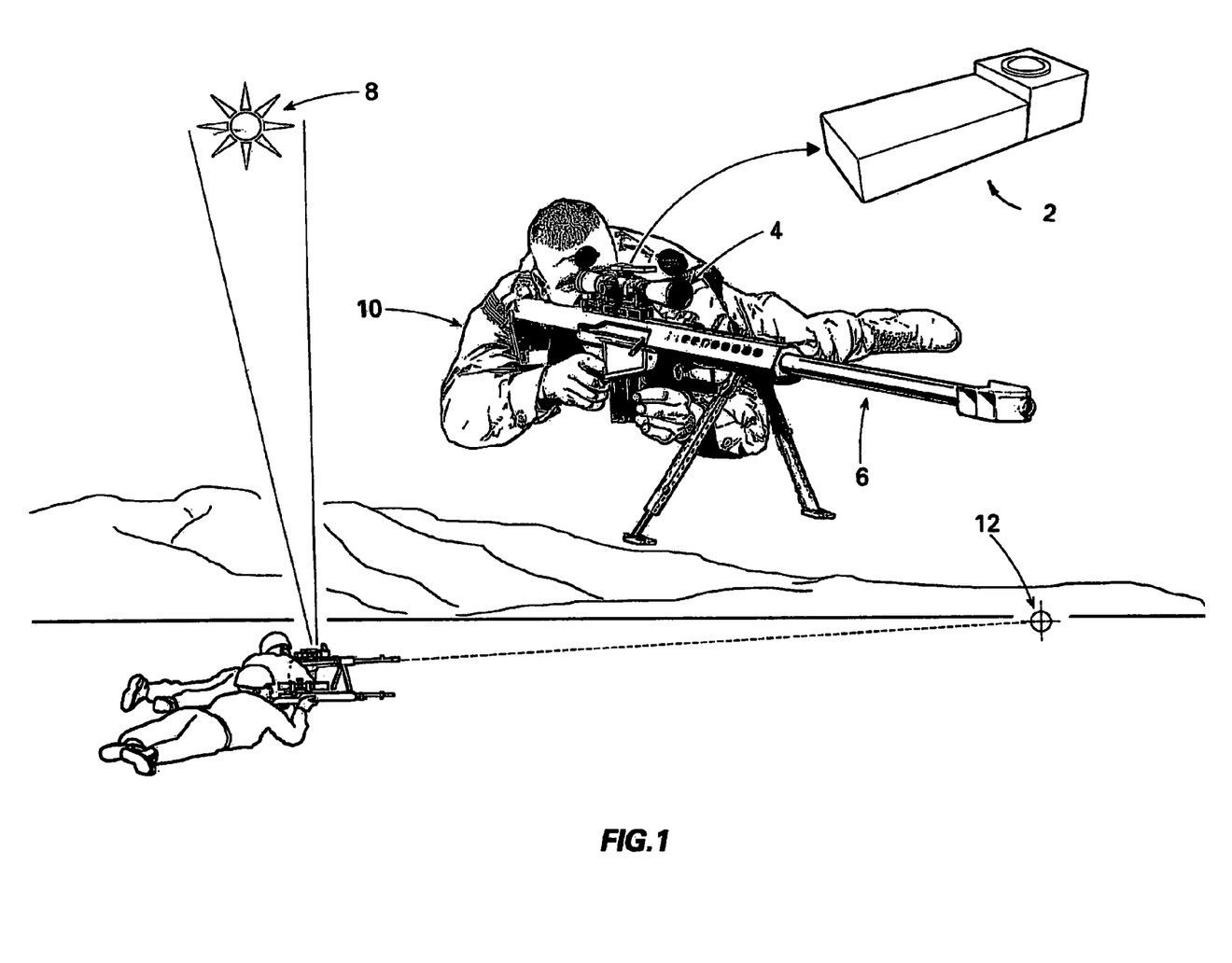
FIG. 1 is a drawing of a preferred embodiment of the present for determining the pointing direction of an M82 rifle.

Preferred embodiments of the present invention can be described by reference to the drawings. A preferred embodiment is shown in FIG. 1. A preferred module 2 of the present invention is mounted on a telescopic sight 4 which is in turn mounted on a M82 0.50 caliber sniper rifle 6. The pointing direction of the rifle is determined by a processor (not shown) contained in module 2 based inputs from a MEMS inclinometer (not shown) contained in module 2 and on the position of the sun 8 and the known date and time reference to a star catalog of the type discussed in the background section. The pointing direction of the rifle 6 when the rifle trigger is pulled by soldier 10 is transmitted via a radio transmitter to a control facility housing a control computer processor. A GPS unit on the target continuously transmits the latitude, longitude and elevation of the target 12 (which may be a pretend enemy soldier in motion) to the control facility. The computer processor utilizing special algorithms determines whether the target was hit. In preferred embodiments the computer processor is programmed to consider effects of wind and gravity on the trajectory of the imaginary bullet. The processor in module 2 uses celestial sighting of the sun, moon or stars to provide absolute azimuth measurements relative to absolute north under clear skies or partly cloudy conditions. An internal MEMS inclinometer provides elevation measurements relative to the local vertical (gravity based). Celestial observations are combined with known observer position and time, obtained from the GPS receiver, in order to compute the absolute azimuth pointing of the device.

The CAM has the following principal advantages:
Nonmagnetic compass
No performance degradation over time (no drift)
Compact
No moving parts
Lightweight
Low power
Low cost
RMS azimuth measurement error is 1 mil
Low production cost Allow for operation in urban environments, near vehicles and power lines, and while wearing body armor
Near zero startup time (azimuth measurement in 1 sec)

Another principal advantage of use of the celestial compass rather than a magnetic compass is that it can continuously measure absolute heading relative to the Earth's true north with accuracy of 1 mil without the use of pre-emplaced infrastructure and does not rely on the use of magnetic compass. However the celestial compass has limitations:

d) It cannot operate in the presence of heavy clouds, fog, and smoke,
e) Highly dynamic conditions can degrade its performance and
f) CAM cannot operate in indoor conditions.

To overcome these limitations Applicants have added an inertial navigation component developed at Innalabs Inc. with offices located in Dulles, Va. and image-based navigation system for position and weapon attitude determination for indoor conditions developed by Evolution Robotics with offices located in Pasadena, Calif. The use of Innalabs component permits the minimization of the effect of environmental conditions and weapon high angular motion rate on module performance. The use of Evolution Robotics image based navigation system permits determination of position and attitude during indoor exercises.

The memory-based optical navigation system includes a processor programmed with images of the environment where the training is to take place. Images of the environment recorded by a camera mounted on the rifle are analyzed with special algorithms by a computer processor which determines, from the camera images and the programmed images, the pointing direction of the rifle.

Embodiments of the present invention also include software permitting users to identify landmarks imaged by the camera and to determine directions to those landmarks from specific locations during cloudless periods and to use those landmarks and directions as references for determining rifle pointing directions when clouds obscure the sun or stars.

Single Camera Modules

Applicants' earlier versions of their celestial compass included separate optical sensors optimized for daytime and nighttime operation along with two small digital cameras and miniature optical lenses. However, to meet the size, weight, and power requirements for determining pointing direction for rifles, a single-sensor design is preferred. The challenge is that a very large sensor dynamic range of $10^{11}$ to $10^{13}$ must be accommodated in order to measure the position of both the sun and stars.

Exposure time and gain control generally provide for approximately $10^5$ range in illumination. To enhance the system's dynamic range, Applicants have developed two candidate solutions:

a) a mechanical neutral density filter to compensate for the remainder of the required dynamic range; and
b) a novel checkerboard filter concept in conjunction with a sensor with a very high dynamic range or an imaging sensor with superior anti-blooming suppression.

Under both approaches, the sensor system includes a fisheye lens, an imaging sensor, a MEMS inclinometer, and a built-in microprocessor.

Removable Filter

Figure 2:
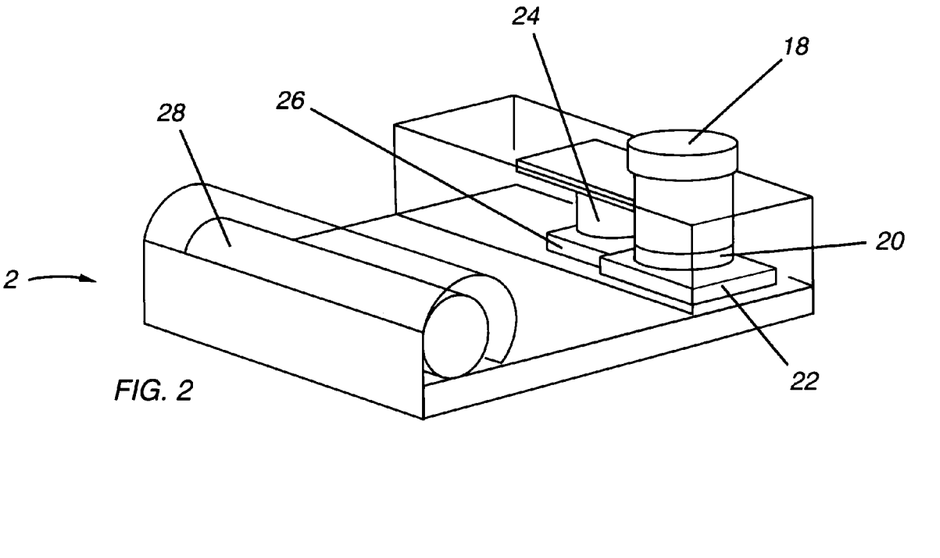
FIG. 2 is a drawing module showing features of a preferred embodiment.

FIG. 2 shows a single-sensor design for a preferred embodiment 2 of the present invention. It includes fisheye lens 18, neutral density filter 20, visible light sensor 22, filter drive motor 24 for inserting and withdrawing the filter from a space between the lens and the sensor, inclinometer 26 and battery 28. The design includes space within the module for the Inolabs inertial navigation component. The total volume is 1 inch by 1.2 inches by 2.5 inches for a total of 3 cubic inches.

The mechanical neutral density filter feature provides the dynamic range required for day/night operation. A motor inserts or removes the filter in about 1 second for day/night operation. The motor is approximately the same size as the fisheye lens. Focus could be maintained by adding a second transparent piece of glass adjacent to the filter glass. This second optic would maintain the optical path length, and would appear in the gap as the filter wheel rotates. An alternative would be to use a very thin filter, like a 12 micron thick aluminized Mylar film, such that the change in focus would be negligible when the filter is inserted.

The sensor and the lens are shown mounted on a single U-shaped fixture to maintain thermal stability. The differential flexure of the pair is preferably less than approximately 2 microns in order to maintain the boresight to within 1 milliradian without using thermal correction factors.

Special Sensor—No Moving Parts

This second approach uses a sensor with high dynamic range, or anti-blooming suppression, in conjunction with a checkerboard filter placed directly over the sensor. This approach eliminates all moving parts, reduces power consumption and increases a reliability of the Celestial sensor. This second concept is described below.

An alternative approach for the single-sensor design is to place an neutral density filter with the required amount of attenuation directly over the imaging sensor in the form of a checkerboard. In preferred embodiments the dark or absorbing squares cover single pixels or arrays of 4 or 9 pixels. The optically attenuated pixels would only be used for imaging the sun, and those un-attenuated pixels would only be used for imaging stars. This scheme essentially combines two separate sensors into one. However, it requires a sufficient numbers of stars with adequate magnitude in the field of view to overcome the fact that half of the sensor would be insensitive to stars. When imaging the sun, some of the optically un-attenuated pixels would be heavily saturated. If the saturation overflowed or "bloomed" to adjacent pixels, that would compromise the ability of the attenuated pixels to accurately image and centroid the sun. Another concern is the diffusion of scattered photons around the edges of filters with large attenuation.

Anti-blooming refers to suppression of electron diffusion from a given pixel well into adjacent wells. For a checkerboard filter concept to work, the anti-blooming suppression must greatly exceed that which can be implemented in CCDs. The anti-blooming capability of CCDs can be as good as $10^4$-$10^5$ above saturation with proper design. The anti-blooming capability of CMOS sensors is often thought to be better than for CCDs, but little or no data is available.

To investigate the anti-blooming capability of CMOS sensors, measurements were made in the Phase I program to estimate anti-blooming suppression in a Lumenera Lu125M industrial camera available at Trex. The following two methods were used to collect the measurements:

1. A laser beam was focused on the camera sensor. Attenuation of the laser beam was varied from below saturation to orders of magnitude above saturation.

2. A flat black disc with a small aperture was placed directly on the sensor and illuminated with a HeNe laser. Intensity was varied from below saturation to orders of magnitude above saturation.

Applicants found that the Lu125m CMOS camera has anti-blooming suppression similar to that of the best CCD cameras. However, all CMOS cameras are not necessarily better than CCDs with respect to blooming. The design must specifically target blooming in order to outperform the best CCDs in this respect.

The final technical solution for a single-sensor system with sufficient dynamic range has not yet been reached. We still need to investigate those sensors advertised as having extreme anti-blooming capability. This will be investigated early in the Phase II program. The preference will be given to the checkerboard approach because it eliminates all moving parts.

Imbedded Micro-Processor

Figure 3:
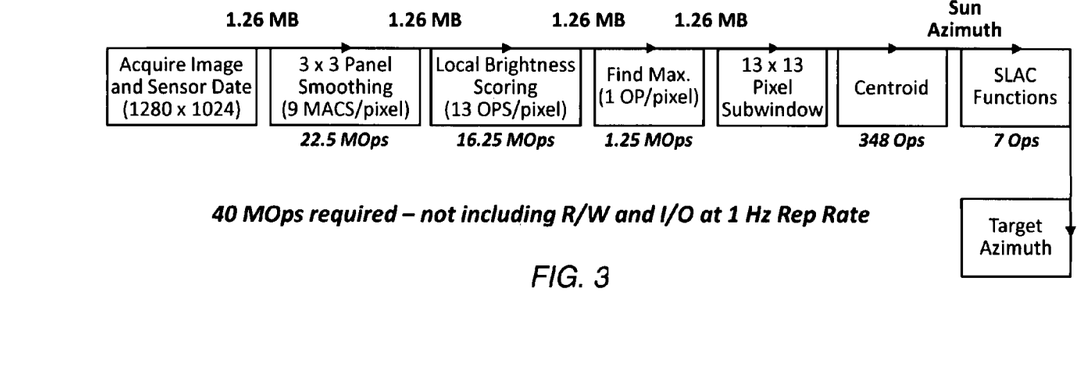
FIG. 3 is a block diagram showing operations needed to determine target azimuth from sun position.

FIG. 3 shows the number of operations required for the daytime sensor to determine target azimuth by imaging the sun. The estimated number of operations per second is 40 Mops. A candidate micro-processor that meets this requirement is the BlackFin embedded processor ADSP BF538 available from Analog Devices. This processor has many several advantageous features such as very low power consumption (400 mW), a small size in a mini BGA package, a very low cost (approx. $45 in small quantities), and a scalable family of pin- and code-compatible parts. The compatible parts allow the processor to fit the application without requiring major changes to either the hardware or the firmware.

Weight and Cost

TABLE 1

CAM Critical COTS components

| COTS Component | Weight | Price |
|---|---|---|
| Fisheye Lens | 9 grams | $100 |
| Sensor (Micron MTM001C12STM) | 5 grams | $ 50 |
| Microprocessor (Analog Devices Blackfin ADSP BF538) | 2 grams | $ 40 |
| MEMS Inclinometer (Analog Devices ADIS16209) | 2 grams | $ 60 |
| ND Filter | 1 gram | $  5 |
| AA Battery | 17.4 grams | $  2 |
| Housing, connectors, circuit boards | 60 grams | $150 |
| CAM Total: | <100 grams | $407 |

Table I shows that the present invention can be built using only off-the-shelf components.

Inertial Navigation Component

The celestial and inertial measurements features of the present invention complement each other well. The celestial measurements are very accurate with essentially no drift over long intervals, but will only be available intermittently due to high sensor motion and environmental conditions. The inertial measurements have very high bandwidth and are accurate over short time periods, but suffer from drift over long time periods. The two will be integrated in the usual Kalman filter architecture illustrated in FIG. 4. All sensors (i.e. the optical sensor, the inclinometer, the inertial navigation component and the magnetic compass will feed data directly to the main processor. The main processor will implement a Kalman filter to optimally combine the inputs from all four sensors.

Figure 5:
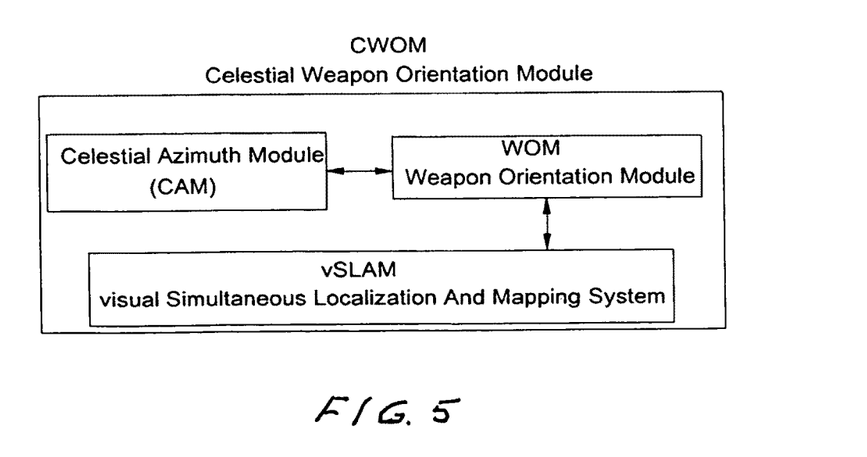
FIG. 5 shows the functioning of Applicants' celestial compass with features of a prior art weapons orientation module.

The Kalman filter will include estimates for the accelerometer gain and bias drift based on the GPS position updates, gyro gain and bias drift based on the magnetic compass and the celestial sensor, and magnetometer bias drift based on the celestial measurements. Since the celestial measurements constitute the most computationally intensive measurements, they will only be updated once every 10 seconds. In the interim, the celestial sensors will be put in standby mode, and the processor clock will be reduced to conserve power. FIG. 5 shows how Applicants' celestial compass (referred to in the drawing as a Celestial Azimuth Module (CAM)) functions with the prior art weapons orientation module.

Operation

In clear sky conditions day and night, the celestial direction components provides periodic precision azimuth measurements with respect to Earth's true north and provides periodic (every 10 seconds) updates to the Kalman filter. The module provides a key element to the initial alignment at start up. Based on celestial azimuth measurements, the Kalman filter estimates the magnetometer bias drift, as well as gyro gain and bias drift. This allows the module of the present invention to mitigate the errors related to the Earth's declination angle occurring over time. The inertial navigation components correct for rifle movement over short periods. Additionally, the 10-second updates eliminate errors associated with local magnetic disturbances. On the other hand, using inputs from the magnetometer, the effects of highly dynamic conditions on performance is mitigated. The inertial navigation components continuously measure the weapon's motion and provide that information to the processor where it is used to determine the aiming direction of the rifle.

Partly Cloudy Skies

Best results from the celestial direction components are achieved on cloudless days and nights. However these components can function in partly cloudy sky conditions. Test results have demonstrated an RMS target azimuth error, for a clear day or night, of 0.1 mil, for a cloudy day of 0.753 mil, and for cloudy night of 0.75 mil.

When clouds, fog, or smoke interfere with celestial measurements using the celestial direction components, the inertial navigation components which includes continuous input from the magnetometer will serve as a "fly wheel" carrying the celestial fix forward and determining the weapon's orientation. However, even in this case, the input from the magnetometer will include corrections (based on the last available azimuth measurement from the celestial direction components) which permit mitigation of the errors caused by the Earth's declination angle and by large magnetic disturbances.

Prototype Test Data

Figure 6:
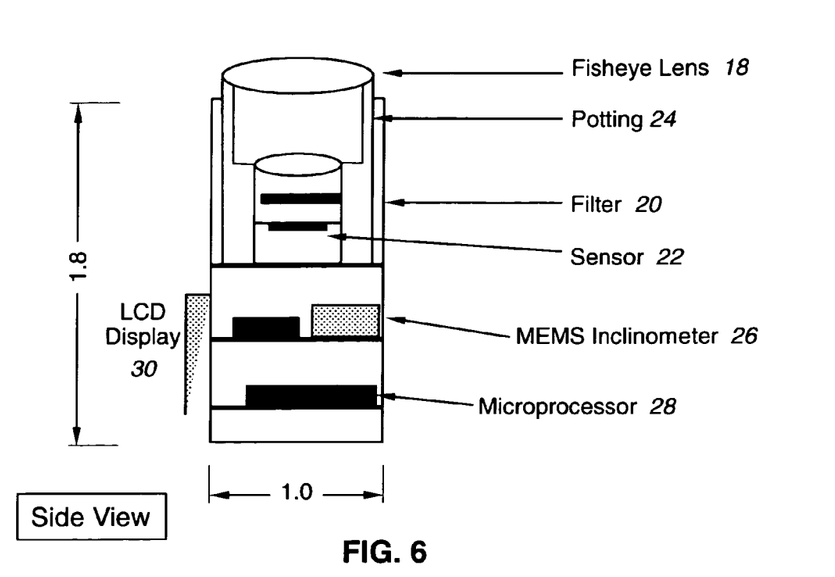
FIG. 6 is a drawing of a miniaturized celestial compass.
Figure 7:
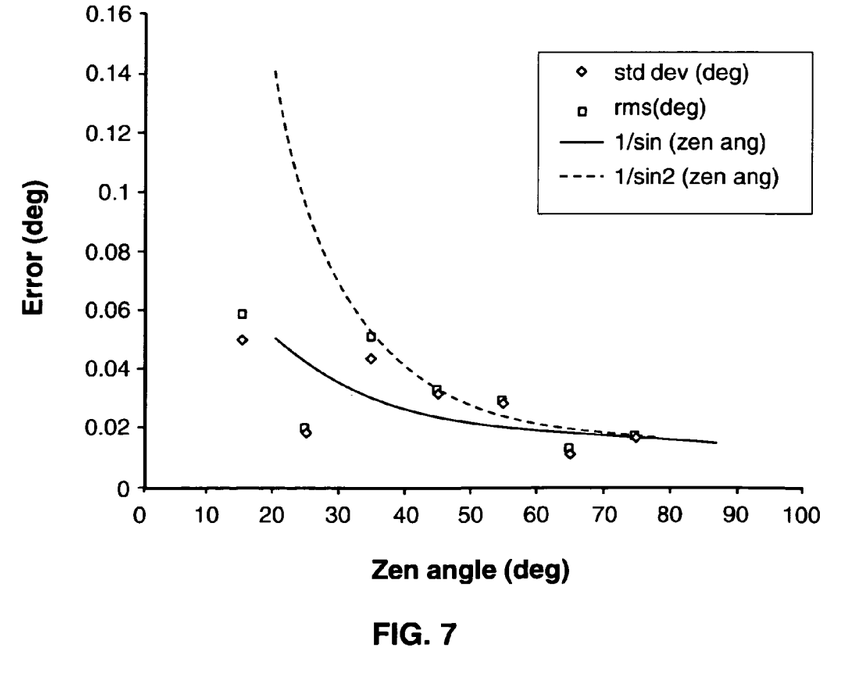
FIG. 7 shows data from field tests of a prototype celestial compass.

FIG. 6 is a drawing of a prototype celestial direction finding unit. Shown are fisheye lens 18, filter 20, sensor 22, potting 24, MEMS inclinometer 26, microprocessor 28 and LCD display 30. The field test data is for this unit is shown in FIG. 7. This figure depicts the RMS and the standard deviation of error of true north measurements from 1, 5, 6 and 10 Aug. 2008 data sets (leveled operation) as a function of solar zenith angle (based on statistics over 10 degree bins). The results show that both the RMS and the standard deviation of true north error are less than 0.06°, or 1 mil. An office field test was performed by the government at NSWC-DD on 3 and 4 Sep. 2008. This test revealed that the average standard deviation for ALL the tests was 1.08 mils.

Power Consumption

Finally, the above describe preferred embodiment has been designed for extremely low power consumption. Various modes of operation are provided: full sleep mode; ready, or stand-by, mode; and operational mode. In the stand-by mode, the microprocessor requires less than 1 mW.

Combining Applicants' Celestial Compass with Prior Art Rifle Pointing Technology Although the significance of magnetic sensing errors is obvious, a practical and effective solution to these errors is less obvious. There are a number of approaches that can be used to address issues related to the Earth's declination angle error. Some examples include calibration procedures or the introduction of magnetic base stations to provide accurate information regarding declination in the locations where testing occurs. However, these approaches do not provide a solution to long-term disturbances occurring from objects in the training area.

The components of the prior art weapons orientation module will measure the weapon orientation, applicants celestial compass components will be relied on periodically to provide a reference to true north, inputting corrections to the Kalman filter components and algorithms of the prior art weapons orientation that will eliminate errors related to changes in the Earth's declination angle occurring over time. Furthermore, by providing a highly accurate understanding of declination angle that is not possible using the prior art weapons orientation components alone. To accomplish this goal, we propose to imbed minimized weapons orientation components into single-camera celestial compass. This integrated device will be able to work in difficult magnetic environments while still providing good dynamic performance.

The Camera

Applicants' prototype camera used a Nikon fisheye 10.5 mm F/2.8 camera lens with a 3.75 mm aperture and a 1.3-million Micron camera available from Edmund Optics with offices in Barrington N.J. With this camera first magnitude stars were visible with very small centroid errors. Preferably an edge detection algorithm should be included in the computer software for precise location of the centroids of the sun and the moon. Positions of celestial objects are known to very high precision, so the azimuth precision is limited mainly by the precision of the optics used to view them. A fisheye lens can view nearly an entire hemisphere. If such a lens is attached to a camera that is looking precisely in the vertical direction, then the sun, the moon, or some bright stars or planets will nearly always be visible except during periods of heavy cloud cover. The image formed by the lens will be captured by a high resolution digital camera, so that the location of the celestial target can be determined to high accuracy. In a test by Applicants, a fisheye lens connected to a camera with approximately 1.3 million pixels was able to provide target location accuracy more precise than ½0th degree. Determining the target centroid to less than one half of its diameter is possible if the signal to noise ratio is high enough. For bright celestial targets, this is normally true.

Correct for Camera Distortion

Converting the pixel location to celestial altitude is performed by measuring the distortion in the camera and using a pixel scale factor in degrees per pixel. To determine the accurate location of a small celestial target relative to the camera requires only a centroid measurement. To determine the accurate celestial location of the sun or moon requires finding the edges of the target and then calculating the true center based on the size and shape of the target at the time of the observation. The software as indicated above must correct for the distortion of the wide angle lens while also converting image data into astronomical coordinates, preferably elevation and azimuth.

Outline of basic daytime algorithm processing steps:
1) Measure sun azimuth and zenith on the fisheye where radius to center is proportional to the zenith angle and azimuth is the angle between column offset and row offset from the center.
2) Mathematically rotate azimuth and zenith angle (small angle approximation) from sensor/fisheye frame to inclinometer frame (i.e. calibrate by determining fisheye boresight when inclinometer is zeroed).
3) Mathematically rotate azimuth and zenith from inclinometer frame to local horizon frame with unknown azimuth offset.
4) Determine azimuth offset by taking difference between measured azimuth (step 3) and known sun position (from time and position).
5) Mathematically rotate boresight pointing in inclinometer coordinates to local horizon coordinates (with unknown azimuth) using inclinometer measurements
6) Determine absolute azimuth of boresight by azimuth offset determined in step (4).

Calibration procedure: Reverse steps (5) and (6) above while siting targets with known absolute azimuth. The calibration procedure and the procedure for absolute target azimuth and zenith (elevation) angle determination is described below.

A brief description of variable notation is summarized in Table 2. The reader should note that all coordinate rotations are based on small angle approximations. This seems reasonable since all measurements of the optical axis offset from the inclinometer z-axis (zenith pointing for zero readings) show angles less than 10 milliradians. All measurements were based on objects with inclinometer pitch and roll readings less than 5 degrees.

The sun position on the sensor is determined by a center of mass calculation. A matched filter determines the location of the sun (not necessary simply finding the peak is sufficient). The background (+camera analog to digital bias) is determined as the average of a 32×32 pixel region centered on the peak and excluding the center 16×16 pixels. A center of mass calculation is made including only those pixels in the 16×16 region with signal exceeding 5% of the peak value.

The equations assume that the image distance from the optical axis on the sensor is a linear function of the zenith angle under the following additional assumptions:
1) Inclinometer axes are orthogonal. (Presumably determined by lithography/etch on MEMS since both axes were on a single die).
2) Row/column axes combined with fisheye boresight constitute an orthogonal coordinate system.

TABLE 2

Parameter Definitions (1) $(x_{s0}, y_{s0})$ = array center in pixels on sensor
(2) $\Delta x$ = angular pixel size
(3) $(\alpha_s, \beta_s)$ = pitch and roll of fisheye optical axis with respect to inclinometer z-axis (zenith for leveled inclinometer)

TABLE 2-continued

Parameter Definitions (4) $(\phi_b, \theta_b)$ = azimuth and zenith angle of binocular boresight in inclinometer reference frame.

Measured Quantities (1) $(x_s, y_s)$ = sun centroid on sensor
(2) $(\theta_x, \theta_y)$ = inclinometer measured pitch and roll.

Calculated Quantities (1) $(\phi_s, \theta_s)$ = measured sun azimuth and zenith angle in sensor/fisheye frame
(2) $(\phi_o, \theta_o)$ = measured sun azimuth and zenith angle in inclinometer frame
(3) $(\phi_l, \theta_l)$ = measured sun azimuth and zenith angle in module based local horizon coordinates
(4) $\Delta\phi_{sun}$ = yaw of module based local horizon coordinates relative to true local horizon coordinates (ENU)
(5) $\phi_l'$ = absolute azimuth of the sun in local horizon coordinates (ENU) calculated based on solar ephemeris, time, and geo-location
(6) $\phi_{bl}'$ = absolute azimuth of the target Detailed equations are set forth below:
Coordinate System for Sun Position Analysis.
(1) Measure sun centroid $(x_s, y_s)$
(2) Azimuth and zenith angles in sensor coordinates $$\varphi_s = \tan^{-1}\left(\frac{y_s - y_{s0}}{x_s - x_{s0}}\right)$$

$$\theta_s = \Delta x \sqrt{(x_s - x_{s0})^2 + (y_s - y_{s0})^2}$$

(3) Rotate to optical axis $$\phi_o = \phi_s + (\beta_2 \sin\phi_s + a_s \cos\phi_s)\cot\theta_s$$

$$\theta_o = \theta_s(-\beta_2 \cos\phi_s + \alpha_s \sin\phi_s)$$

(4) Rotate to local horizon using inclinometer measurements, $(\theta_x, \theta_y)$ $$\phi_l = \phi_o + (\theta_y \sin\phi_o - \theta_x \cos\phi_o)\cot\theta_o$$

$$\theta_l = \theta_o + (\theta_y \cos\phi_o + \theta_x \sin\phi_o)$$

$$\Delta\phi_{sun} = \phi_l' - \phi_l$$

where $\phi_l'$ is the absolute azimuth of the sun.
(5) Rotate boresight to local horizon coordinates $$\phi_{bl} = \phi_b - (\theta_y \sin\phi_b - \theta_x \cos\phi_b)\cot\theta_b$$

$$\theta_{bl} = \theta_b + (\theta_y \cos\phi_b + \theta_x \sin\phi_b)$$

$$\phi_{bl}' = \phi_{bl} - \Delta\phi_{sun}$$

where $\phi_{bl}'$ is the absolute azimuth of the target, and $\theta_{bl}'$ is the absolute zenith angle of the target.

Calibration Procedures

Several calibration parameters must be determined experimentally. They are listed as the first set of items (1) through (4) in Table 2. Based on small angle approximations the systematic error in measured azimuth resulting from errors in the array center point and off zenith fisheye boresight is given by:

$$\Delta\phi = (a_s \cos\phi_s + \beta_s \sin\phi_s)\frac{\cos\theta_s}{\sin\theta_s} - \frac{\Delta\theta_c}{\theta_s}\sin(\phi_s - \phi_c)$$

where $\Delta y$ is the error in the azimuth measurement, $(\phi_c, \Delta\theta_c)$ describes the azimuth and zenith angle on the error in center position, and the remaining parameters are described in Table 2. Notice for a fixed zenith angle, errors in boresight pointing may be corrected by the errors in center location. The expression may be rewritten in terms of an effective center point and divided into sensor row and column, $$\Delta x_c = \beta\theta \frac{\cos\theta}{\sin\theta}$$

$$\Delta y_c = \alpha\theta \frac{\cos\theta}{\sin\theta}$$

The calibration procedure takes advantage of this property by determining the center location which minimizes the azimuth error (in the least squares since) for a series of measurements at a constant (or near constant for sun) zenith angle. The procedure is repeated for several zenith angles, and the results are plotted as a function of $$\theta \frac{\cos\theta}{\sin\theta}.$$

The slope of a linear least squares fit provides the axis pitch (or roll), and the intercept provides the offset in center column (or row).

Error Analysis

The following is an error analysis. It is based directly on the coordinate transformation equations detailed above, so it cannot be considered an independent check. The results are based on small value approximations. As a first approximation two axis values which add in quadrature phase (a cos x+b sin x) are simply combined in a single "average" term, and systematic errors (such as errors in determining the calibration parameters) are treated in the same manner as random errors (centroid measurement error, mechanical drift, inclinometer noise, etc).

An attempt is made to maintain consistent notation with the explanation of the coordinate transformation. For the simplified case with the inclinometer level, the variance in determining absolute azimuth is approximately:

$$\sigma_{\varphi_{bl}}^2 = \sigma_{\varphi_b}^2 + \sigma_{\varphi_l}^2 + \left(\left(\frac{1}{\theta_s}\right)^2 + \left(\frac{\overline{\alpha}_s}{\sin^2\theta_s}\right)^2\right)\sigma_{x_s}^2 + \left(\frac{\overline{\alpha}_s}{\sin^2\theta_s}\right)^2 \left(\left(\frac{\Delta x_e}{\Delta x}\right)\theta_s\right)^2 + \sigma_{\alpha_s}^2 \cot^2\theta_s + \left(\frac{1}{\sin^2\theta_s}\right)^2 \sigma_{\theta_x}^2$$

A brief summary of the terms is listed in Table 3.

TABLE 3

Summary of error contributions for leveled operation.

(1) $\sigma_{\varphi_b}$ = error in boresight azimuth calibration
(2) $\sigma_{\varphi_l}$ = error in calculated sun location in ENU frame. Time, geo-location, and ephemeris errors are all believed to be negligible. Error for
(3) $\overline{a}_s$ = average of fisheye boresight angular offset from inclinometer z-axis
(4) $\sigma_{x_s}$ = error in sun position on sensor (centroid accuracy based on radiometric SNR, gain variation, and image distortion). SNR contribution believed to be small (image ~3 pixels and camera gain, exposure time set to ~200 counts out of 255, noise measured < 1 bit rms). Gain variation not measured. Image distortion, especially for large zenith angles is under investigation.

TABLE 3-continued

Summary of error contributions for leveled operation.

(5) $\frac{\Delta x_e}{\Delta x}$ = fractional error in pixel size (based on linear fisheye response, more generally $\left(\frac{\Delta x_e}{\Delta x}\right)\theta_s$ should be replaced as systematic error in measuring zenith angle). Response nonlinearity suspected problem. Correction under investigation.
(6) $\sigma_{a_s}$ = error in determining fisheye boresight calibration parameters plus boresight drift (time/temperature). Fisheye boresight calibration long term repeatability under investigation.
(7) $\sigma_{\theta_x}$ = noise in inclinometer measurement.

If the device is permitted to pitch and bank, there is an additional error term which is proportional to the magnitude of the pitch and/or bank of:

$$\frac{\sigma_{\varphi'_{blin}}}{\theta_x} \approx \frac{1}{\sin^2\theta_s} \sqrt{\sigma_{x_s}^2\left(\left(\frac{\sin\theta_s\cos\theta_s}{\theta_s}\right)^2 + 1\right) + \sigma_{a_s}^2 \cdot (1 + \cos^4\theta_s) + \left(\left(\frac{\Delta x_e}{\Delta x}\right)\theta_s\right)^2}$$

Where a contribution from the boresight zenith angle relative to inclinometer zenith has been omitted (assumed negligible). The reader should note that this corresponds to an rms value instead of the variance shown for leveled operation. All of the error terms are the same as described in Table 3 with the exception of, $\sigma_{\theta x}$, the inclinometer measurement error. For pitched/banked operation, the inclinometer measurement error now includes not only noise, but any gain or nonlinearity contributions.

In addition to the error sources discussed above, the measurements will have two additional error sources. The first is the accuracy of the reference points. The second is pointing the Vector 21 (~1.2 mr reticule diameter). Current rough estimate is that these error sources are on the order of 0.5 mr rms.

Test data proving the accuracy of this embodiment utilized with the Victor 21 binoculars and with a theodolite is reported in parent patent application Ser. No. 12/283,785 which has been incorporated herein by reference.

Once the target is identified, additional software determines the orientation of the camera. Astronomical algorithms and celestial navigation software suitable for programming computer 22 is described and provided in several well-known texts including *Astronomical Algorithms* by Jean Meeus that is referred to in the Background Section. Once the camera orientation is known, the azimuth of the instrument is easily computed.

Boresighting the Module with Other Instruments

Calibration of the module with other optical instruments requires a single calibration. A target at a known azimuth is imaged by the other optical instruments at the same time that a celestial measurement is made. The azimuth reported by the celestial measurements is then rotated to agree with the other optical instruments.

Miniaturized Versions

Figure 4:
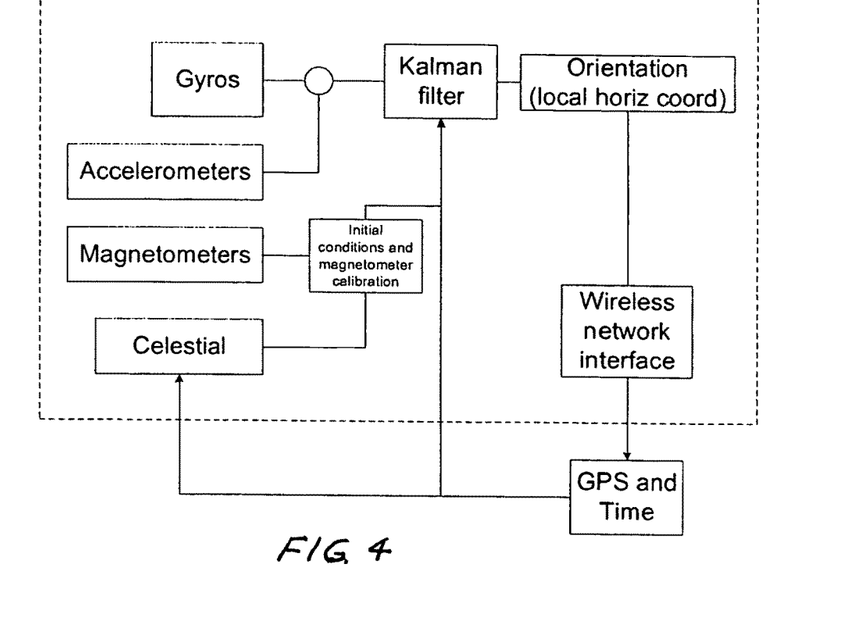
FIG. 4 shows a preferred technique for integrating information from the several sensors of the present invention.

Applicants have prepared designs for a miniaturization of the present invention. Preferred preliminary design are shown in FIGS. 2 and 4. FIG. 4 shows dimensions and features. The module includes a single celestial camera with a fisheye lens 60 (Model DSL-215) available from Sunix, Inc with offices in Carlsbad, Calif., with a movable filter 62 for filtering sunlight for daytime operation. It also includes a 1280×1024 pixel sensor 64 Model MTM001C12STM) available from Micron Technology Inc. with offices in Manassas, Va., a MEMS inclinometer 66 (Model ADIS16209) available from Analog Devices and a microprocessor 68 also available from Analog Devices (Model ADSP BF538). This is a tiny module measuring as indicated in FIG. 4 about 1.8 inches high and 1 inch in cross section. The unit includes a LCD display 70 and is powered by a ¼ watt battery 72.

Challenges and Solutions of the Single Camera Embodiments

In order to measure the position of both the sun and stars, a very large dynamic range of $10^{11}$ to $10^{13}$ must be accommodated. For example, illuminance due to various sources is shown in Table 4. Assuming that the detector must be able to image the sun at its brightest and stars of $1^{st}$ magnitude, the illumination range is $10^{11}$. For imaging of the sun and $6^{th}$ magnitude stars, the range is $10^{13}$.

TABLE 4

Illumination due to various sources (RCA Electro-Optics Handbook 1974).

| Source | Illumination (lux) |
| --- | --- |
| Sun at brightest | $1.24 \times 10^5$ |
| Sirius | $9.80 \times 10^{-6}$ |
| Zero Mag. Star | $2.65 \times 10^{-6}$ |
| $1^{st}$ Mag. Star | $1.05 \times 10^{-6}$ |
| $6^{th}$ Mag. Star | $1.05 \times 10^{-8}$ |

Exposure time and gain control generally provide for about $10^5$ range in illumination.

Two sensors could be used, but this would increase the cost, weight, and bulk of the system. Alternatively, a moving filter could be used to compensate for the remainder. However, moving parts are more likely to fail, and require the operator to make adjustments. Two alternative solutions have been developed by Applicants. To address the dynamic range issue, Applicants have developed two alternative strategies. The first is to place a checkerboard neutral density filter over the sensor, and thus essentially combine two sensors into one. For this concept to work, the anti-blooming suppression must greatly exceed that which can be implemented in CCDs. Charge injection devices (CIDs) have been shown to have superior anti-blooming suppression. The second alternative approach is to utilize a sensor with a very high dynamic range. Dynamic ranges of 100 dB to 140 dB are available. Some of these devices should be able to directly image both the sun and stars. Affordable models are becoming commercially available.

Checkerboard Approach

One solution is to place a filter of the required amount directly over the sensor in the form of a checkerboard. The dark or absorbing squares might cover single pixels or arrays of 4 or 9 pixels, for instance. The optically attenuated pixels would only be used for imaging the sun. The optically un-attenuated pixels would only be used for imaging stars. This scheme combines two separate sensors into one. However, a sufficient numbers of stars with adequate magnitude would be required in the field of view to overcome the fact that half of the sensor would be insensitive to stars. When imaging the sun, some of the optically un-attenuated pixels would be heavily saturated. If the saturation overflowed or "bloomed" to adjacent pixels, that would compromise the ability of the attenuated pixels to accurately image and centroid the sun. The question arises as to how well anti-blooming technology functions. Anti-blooming refers to suppression of electron diffusion from a given pixel well into adjacent wells. Another concern is diffusion of scattered photons around the edges of filters with large attenuation. To address these concerns, the anti-blooming capabilities of CCDs, CMOS, and CIDs were explored.

When a pixel is exposed to light and the well is filled with charge, the charge will begin to overflow to nearby pixels unless some type of anti-blooming is implemented. For CCDs there are three categories of anti-blooming:

1. Charge pumping or clocked anti-blooming
2. Lateral overflow drain
3. Vertical overflow drain Charge pumped or clocked anti-blooming has a maximum capacity of about 50-100 times overexposure.

Overflow drains in each pixel are possible. They tend to produce a non-linear signal response for signals near saturation due to progressive loss to the drain. Lateral overflow drains occupy pixel real estate, and reduce fill factor. Vertical overflow drains refer to drains that physically lie underneath the pixel and therefore do not diminish the fill factor. However, the red and IR response is typically diminished with vertical drains because the longer wavelengths are deeper penetrating and a percentage is lost in the drain. The anti-blooming ability withstands brightness over several $10^5$ lux. There is an imaging sensor related to CMOS called a charge injection device or CID. These devices are known to have excellent anti-blooming capability.

Large Dynamic Range CMOS

Another solution to the problem of dynamic range is CMOS sensors with enormous dynamic range. These sensors are available, some at a reasonable cost. They have ranges of 100 dB-140 dB and some of them should be able to directly image both the sun and stars. One such camera is the Bci5 camera available from C-Cam Technologies. This camera has the same pixel count and frame rate as the current cameras, but a slightly larger pixel size. To further increase the dynamic range, a photo-chromic filter as utilized in ordinary eyeglasses could be added. These filters are capable of almost an order of magnitude variation in transmission. The filter would suppress transmission when imaging the sun, but exhibit maximum transmission when imaging stars.

Cloudy Weather

As indicated above in connection with the description of preferred embodiments. The primary components of the present invention cannot function as desired in cloudy weather or in similar situations when the celestial objects are not visible to the system's sensors. For these reasons many embodiments may be equipped with a backup digital magnetic compass. This magnetic compass can be calibrated periodically using the features of the present invention and can take over when the heavens are obscured. Alternatively or in addition a miniature attitude and reference system such as the systems discussed in the background section of this specification may be added to allow the target information to be determined in the event that clouds obscure the celestial objects. Also when systems of the present invention is located at a particular location the precise location to a local landmark can be identified by the system and utilized to provide reference directions later in the event of cloudy weather. To utilize this feature an additional camera may be required to assure that an appropriate local landmark is in the field of view of system camera.

Applications of the Present Invention

Embodiments of the present invention include in many applications where high accuracy directional equipment is needed such as for use in surveying, on cruise ships, fishing boats and private and commercial aircraft. The invention may also be utilized on robotic vehicles including unmanned aerial vehicles, unmanned marine vehicles and unmanned surface vehicles. A particular important use of the invention will be as a guidance and control feature for robotic vehicles designed for use in dangerous situations where accurate directional information is required. For example, in addition to the telescopic equipment the celestial camera and the MEMS mirror of the present invention, the robotic surveillance vehicle could be equipped with a GPS unit, and a backup digital magnetic compass and a camera for monitoring the field of view of the telescopic equipment. Communication equipment would be needed for remote control of the robotic vehicle. Utilizing features described in the embodiments described above dangerous targets could be identified and neutralized. Embodiments could include weapons for defense or even offence which could be operated remotely.

There are many variations to the above specific embodiments of the present invention. Many of these will be obvious to those skilled in the art. For example in many embodiments focal plane arrays with only about 350,000 pixels will be adequate. Preferably time should be accurate to at least three seconds. For a less expensive system, the inertial navigation system and the memory-based navigation could be omitted. In this case the system would in general not be operative in cloudy weather. However, local landmarks that are visible to the camera could be substituted for celestial objects if the system is properly calibrated using celestial information to determine the position of the landmarks. Operators could also install a substitute landmark to use in this situation. These landmarks could also be used in the full system with the inertial navigation for re-calibration in the event of cloudy weather. So the scope of the present invention should be determined by the appended claims and their legal equivalence.

What is claimed is:

1. A celestial weapons orientation measuring system for measuring the pointing direction of a weapon at a time of a simulated discharge of the weapon, said system comprising:
    A) a telescope bore sighted with the weapon and adapted to permit accurate pointing of the weapon at a target; and
    B) a miniature celestial direction detection device, for determining pointing directions of the weapon, mounted on and aligned with the weapon and comprising:
        1) at least one camera for viewing a large portion of the sky, said camera comprising:
            a) a wide angle fish eye lens and
            b) a sensor having a focal plane array of at least 350,000 pixels and adapted to provide camera images of at least one celestial object chosen from the following group of celestial objects: the sun, the moon and at least one star; and
        2) a gravity based MEMS inclinometer adapted to provide elevation measurements relative to local vertical and
        3) a least one microprocessor programmed with:
            a) an astronomical algorithm containing a celestial catalog defining locations of celestial objects based on known time; and
            b) coordinate transformation software for converting pixel data into astronomical coordinates;
            c) software adapted to compute pointing directions of the weapon at the time of a simulated discharge based on:
                i) an inclination of the system as measured by the inclinometer and
                ii) the azimuth of the pointing direction of the weapon based on (a) known time, (b) known weapon position, (c) known positions of the at least one celestial object as provided by the celestial catalog and (d) the image of the at least one celestial object as imaged by the camera;
    C) a first GPS detector located on or nearby the weapon for determining location of the weapon;
    D) a second GPS detector mounted on a target such as a pretend enemy soldier or
    E) a processor or processor components with software programmed with an algorithm for analyzing orientation information from said miniature celestial direction detection device and weapon and target location information to determine if the target would have been hit or missed by a discharge from said weapon;
    wherein the weapon is pointed at the target based on a visual image of the target obtained through the telescope, and wherein a successful hit or miss is determined by the processor or processor components based on known locations of the weapon and the target and pointing directions of the weapon as determined by the at least one microprocessor.

2. The system as in claim 1 wherein said inclinometer is a MEMS inclinometer.

3. The system as in claim 1 wherein said location of the weapon and location of the target are provided in terms of latitude, longitude and elevation.

4. The system as in claim 1 wherein said camera defines an optical path and comprises a motor-driven filter for removing the filter from the optical path.

5. The system as in claim 1 wherein said camera comprises a checkerboard filter adapted to permit said camera to image the sun in daytime and stars at nighttime.

6. The system as in claim 1 wherein said system is installed on a robotic vehicle.

7. The system as in claim 6 wherein said robotic vehicle is adapted for surveillance.

8. The system as in claim 1 and further comprising a magnetic compass.

9. The system as in claim 8 wherein said processor is programmed to utilize information from said celestial direction detection device to calibrate said magnetic compass and to utilize magnetic compass signals for azimuth direction when celestial objects are obscured.

10. The system as in claim 1 and further comprising an inertial navigation sensor.

11. The system as in claim 1 and further comprising a memory-based optical navigation system.

12. The system as in claim 1 and further comprising an inertial-based navigation system and a memory-based optical navigation system.

* * * * *